United States Patent
Rengman

(10) Patent No.: US 6,845,189 B2
(45) Date of Patent: Jan. 18, 2005

(54) SYSTEM AND A METHOD FOR LIMITING THE MAXIMUM OF LIGHT TRANSMITTED FROM A RIBBON FIBER

(75) Inventor: Jacob Rengman, Lidingo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/416,567

(22) PCT Filed: Nov. 8, 2001

(86) PCT No.: PCT/SE01/02475
§ 371 (c)(1),
(2), (4) Date: Dec. 16, 2003

(87) PCT Pub. No.: WO02/41532
PCT Pub. Date: May 23, 2002

(65) Prior Publication Data
US 2004/0086217 A1 May 6, 2004

(30) Foreign Application Priority Data
Nov. 15, 2000 (SE) .............................................. 0004183

(51) Int. Cl.$^7$ ............................. G02B 6/28; H04B 10/08
(52) U.S. Cl. ............................. 385/24; 385/31; 385/88; 385/89; 385/15; 398/25; 398/30
(58) Field of Search ............................. 385/24, 31, 14, 385/88, 89, 92, 15; 398/25, 28, 26, 30, 82, 101

(56) References Cited

U.S. PATENT DOCUMENTS

| | | | | |
|---|---|---|---|---|
| 5,475,778 A | * | 12/1995 | Webb | 385/31 |
| 5,625,730 A | * | 4/1997 | Ishikawa et al. | 385/49 |
| 5,719,979 A | * | 2/1998 | Furuyama | 385/89 |
| 5,841,776 A | * | 11/1998 | Chen | 370/441 |
| 5,956,168 A | | 9/1999 | Levinson et al. | 348/66 X |
| 6,597,826 B1 | * | 7/2003 | Ramaswami et al. | 385/17 |

FOREIGN PATENT DOCUMENTS

| | | | | |
|---|---|---|---|---|
| DE | 4317863 A1 | 12/1994 | | 385/24 |
| EP | 1006682 A2 | 6/2000 | | 385/24 |
| EP | 1017192 A1 | 7/2000 | | 385/24 |
| EP | 1041747 A2 | 10/2000 | | 385/24 |

* cited by examiner

Primary Examiner—Brian M. Healy
(74) Attorney, Agent, or Firm—Nixon & Vanderhye P.C.

(57) ABSTRACT

A terminal is connected to a communication link comprising a ribbon fiber for communication in two directions over pairs of fiber in the ribbon. For each incoming fiber in the ribbon fiber a receiver is connected to an amplifier/detector which emits detection signals on line. The detection signals indicate that there is sufficient optical power in the corresponding incoming fibers and are supplied via gates to control units. These control whether electric signals incoming on lines are to be conveyed further to transmitters for being sent on the outgoing fibers. A channel selector unit delivers selector signals to the gates so that when insufficient optical power exists in an incoming fiber the corresponding transmitter is only permitted to transmit during short repeated periods and is shut off in between.

15 Claims, 1 Drawing Sheet

SYSTEM AND A METHOD FOR LIMITING THE MAXIMUM OF LIGHT TRANSMITTED FROM A RIBBON FIBER

This application is the US national phase of international application PCT/SE01/02475 filed 8 Nov. 2001 which designated the U.S. and claims benefit of SE 0004183-0, dated 15 Nov. 2000, the entire content of which is hereby incorporated by reference.

TECHNICAL FIELD

This invention refers to a system and a method for controlling communication links and particularly for limiting light transmitted from a place of interruption in a ribbon fiber included in a communication link.

STATE OF THE ART

Optical fibers can be interconnected side by side so as to form a ribbon fiber. Light intended for transmission in optical fibers and ribbon fibers is obtained from various optical transmitters such as diodes and, above all, lasers. Safety regulations include the stipulation that if a ribbon fiber is to be considered as being safe for the eyes, the total power of light transmitted from all fiber components included in the ribbon fiber must not exceed a predetermined value. However, this is only in the cases where measuring the light in the fibers can be carried out, for example when someone pulls apart two contacts between fibers or when a fiber in a ribbon fiber is cut off. Hence, it is permissible to use relatively high light power and thereby to drive lasers transmitting the light with relatively high power for normal communication if a detection mechanism is included for attenuating light in the fibers when an interruption occurs. This is called "Automatic Power Reduction" (APR). Systems for achieving this type of automatic reduction of the light power are known in the prior art for individual fibers, wherein thus when interruption occurs in the fiber the intensity of the light in the fiber is decreased so that it will lie below a predetermined limit value.

If present methods for automatically decreasing power are applied to ribbon fibers it would be possible for a plurality of interrupted fibers to exceed together the mentioned limit value for light transmitted from the ribbon fiber, as the power of light which is transmitted in different fibers is entirely individual. In addition the power consumption of associated electric circuits would be uneven and would cause a higher peak output and might possibly cause communication errors, at least if interruptions occur in all of the fibers simultaneously.

There are other solutions for reducing the laser emission in a ribbon fiber. For example, part of the bandwidth of the ribbon fiber can be utilized for transferring verifying information which shows whether the ribbon fiber is unbroken or not, whereafter the emission level is adjusted on the basis of known principles.

DESCRIPTION OF THE INVENTION

An object of the present invention is to provide a system and a method for limiting the maximimum of light transmitted from a ribbon fiber at the occurrence of interruptions in the ribbon fiber.

A specific object of the invention is to provide a system and a method for preventing laser radiation dangerous to the eyes from being transmitted by an interrupted optical fiber included in a communication link having a plurality of fibers, such as a ribbon fiber, or from an extended, independent fiber contact associated with a communication link having a plurality of fibers.

These objects are achieved by the invention, the features and characteristics of which may be found in the accompanying claims.

Concurrently with these objects, retaining the instantaneous peak output at a low level is achieved. By means of the invention, lower instantaneous peak output and more even power consumption of the driving circuits are also achieved. Thereby the interruptions of surrounding equipment are also reduced for fulfilling the requirements of "Electro Magnetic Compatibility" EMC.

If a plurality of pairs of fibers in a fiber link or a ribbon fiber are subjected to interruptions, light is transmitted solely in one of the broken pairs of fibers at a time. This limits the total transmitted light intensity at the place of interruption, and hence the maximum permitted total light intensity of the entire ribbon fiber is not exceeded.

Generally speaking, a node or terminal is connected to a communication link comprising a plurality, N, of optical fibers divided into N/2 pairs of fibers. Each pair of fibers includes an incoming fiber and an outgoing fiber. For each incoming fiber of the communication link there is a receiver for receiving optical signals. For each outgoing fiber there is a transmitter for transmitting optical signals. The receiver converts the incoming optical light signals to electric signals. A detector emitting a status signal is connected to the receiver and indicates whether an optical signal is being received. For example, it can indicate whether the received optical signal has sufficient intensity or sufficient power, i.e. whether any one of these quantities exceeds a threshold value. The detector is in turn connected to a control unit which determines if transmission of light is permitted or not on the outgoing fiber which is included in the pair of fibers. The control unit is in turn connected to the transmitter which is connected to the outgoing fiber in the pair of fibers. The transmitter converts the outgoing electric signals to optical signals for transmission on the outgoing fiber which is connected to the transmitter. Hence, in the normal case, there are equally many receivers, detectors, control units and transmitters as the number of pairs of fibers in the ribbon fiber, although this is not always necessary. A channel selector unit controlled by a clock signal from a clock generator is connected to the control units to ensure that the transmission is carried out on appropriate outgoing fibers.

The advantage of the system and the method in accordance with the invention is that by means thereof, the maximum amount of light transmitted from a ribbon fiber, when an interruption occurs in the ribbon fiber, is limited so as to prevent laser radiation dangerous to the eyes from being transmitted from an interrupted optical fiber included in a communication link having a plurality of fibers or from an extended, independent fiber contact associated with such communication link. Furthermore, the instantaneous peak power is retained at a low level and lower instantaneous peak power and more even power consumption of the driving circuits are achieved so that i.a. the interference of the surrounding equipment by said circuits is reduced.

DESCRIPTION OF THE FIGURES

The invention will now be described as a non-limiting embodiment in connection with the accompanying drawing in which.

PREFERRED EMBODIMENT

Figure 1:
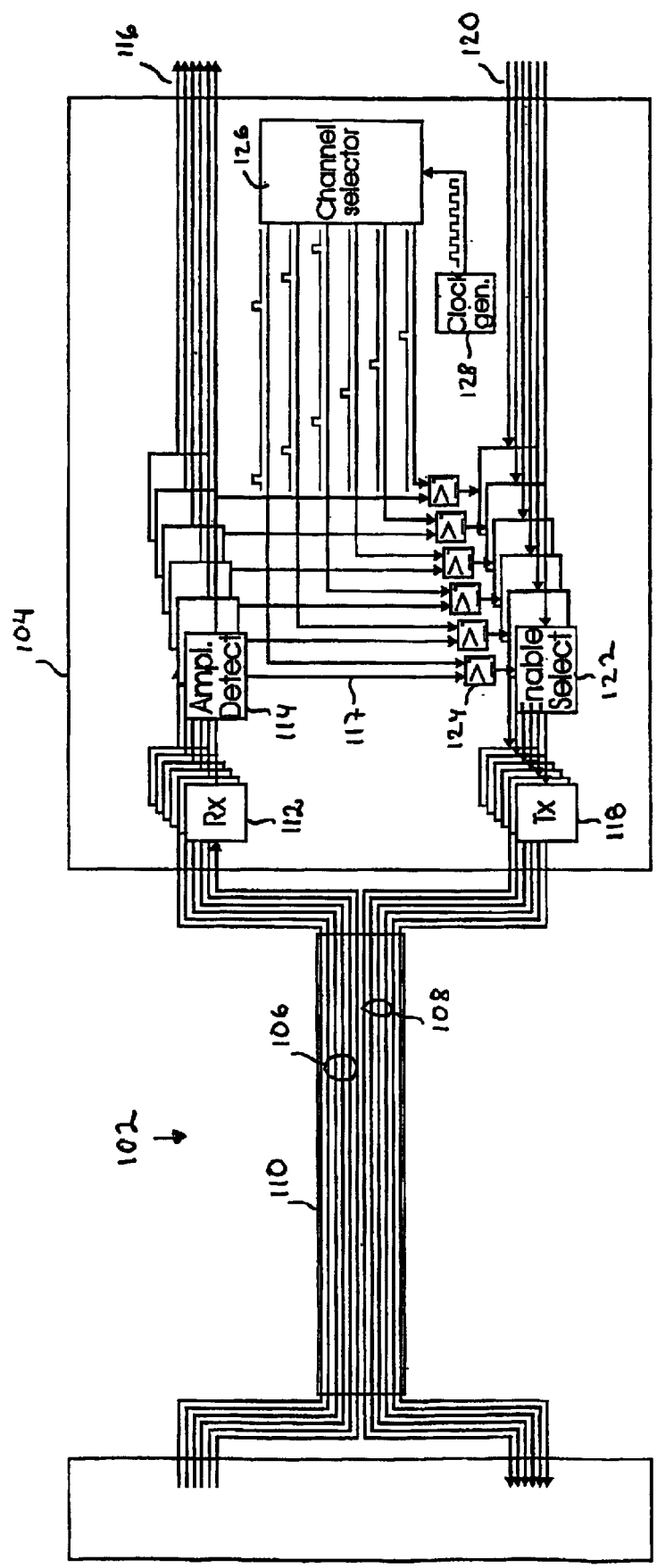
FIG. 1 is a schematic view of a communication system comprising terminals which contain devices for limiting the total intensity of light which is propagated in a ribbon fiber.

FIG. 1 shows a fiber-optical communication system which comprises communication links 102 between terminals 104. Each communication link 102 comprises a plurality of optical fibers which for a relevant terminal 104 connected to the link are subdivided into incoming fibers 106 and outgoing fibers 108, whereby pairs of optical fibers are obtained, with one incoming fiber and one outgoing fiber in each pair. The optical fibers 106, 108 in a link 102 may to advantage be included in a ribbon fiber 110. Terminal 104 receives signals or information and transmits signals or information to other terminals in the communication system via the optical fibers 106, 108 that are included in the ribbon fiber 110. Communication link 102 can generally comprise N individual optical fibers, wherein N is an even integer. For example, for a link 102 with 12 individual optical fibers, one ribbon fiber with 12 fibers or two ribbon fibers each with six fibers may be used. In this case there are six pairs of fibers.

Each terminal 104 comprises optical receivers or optoelectrical converters 112, for example PIN diodes, connected to the incoming fibers 106 in link 102 for receiving light containing information transmitted on the respective incoming fibers. The electric signals which are delivered by receivers 104 are decoded in amplifying and detecting units 114, from which the received information is delivered as electric signals on output lines 116. Each terminal 104 also comprises optical transmitters or optoelectrical converters 118 connected to the outgoing fibers 108 in link 102 for transmitting light containing information in the respective fibers. Transmitters 118 may to advantage comprise semiconductor lasers. The transmitters receive electrical signals from input lines 120 via control units 122 which carry out control of when signals may be sent from the terminal. The amplifying and detecting devices 114 deliver control signals on lines 117 which are connected to the inputs of OR gates 124, the outputs of which are connected to a corresponding control unit 122. The OR gates 124 receive a second input signal from a channel selector unit 126 which in turn is controlled by a clock signal from a clock circuit 128.

The function of terminal 104 in normal transmission and reception is as follows. In normal function, optical signals which under ordinary circumstances contain digital information are received on the incoming fibers 106 in ribbon fiber 110. The signals in such fiber are received in the receiver 112 which is connected to this fiber. In this receiver the incoming signals are converted to electrical signals. These electrical signals are then transmitted further to a corresponding one of the amplifying and detecting units 114, which unit is individually associated with this receiver, and hence there are equally many signal dectectors 114 and receivers 112. The amplifying and detecting unit 114 amplifies and senses the electrical signals and transmits the information carrying portion which contains the digital information from the incoming fiber further on to one of the output lines 116. The amplifying and detecting unit also senses whether any signal at all is fed from the corresponding receiver 112 to the unit and hence whether any optical signal is received by the receiver 112. The sensing can for example be carried out by the amplifying and detecting unit sensing the average level of their electrical input signals and comparing this level to a predetermined threshold value. Alternatively, this type of sensing can be carried out directly by the receivers 112. On its output line 117 amplifier/detector 114 delivers a signal, which indicates the sensing result and which can be designated as "Loss of signal" or "Signal detected", to a corresponding one of the OR gates 124. The sensing signal on lines 117 is here considered to have a high logic level when an optical input signal exists and a low logic level in all other cases. Thus, when optical signals are received by a receiver 112 a high signal is fed to the corresponding control unit 122 which then passes the electricalal signals from the corresponding incoming electric line 120 to the respective transmitter 118. Hence, when an input signal exists on an incoming fiber 106, an optical signal is transmitted on the outgoing fiber 108 which is included in a pair with the relevant incoming fiber.

In general, three different cases can be found:

1. (The normal case described above.) There are incoming signals in communication link 102. Normal transmission of optical signals occurs from terminal 104.
2. One or more fibers in link 102 are interrupted, or the incoming light on at least one fiber has too low intensity or power.
3. Initiation of communication in one, several or all pairs of fibers in ribbon fiber 110 in link 102 is desired.

Thus, Case 2 occurs when a fiber contact has been pulled out or a fiber in a pair of fibers has a deficiency or has broken apart or when transmitting equipment connected to the opposite end of ribbon fiber 110 is disconnected. Receiver 112 then does not detect light on incoming fiber 106 which is connected to the receiver. Light is not to be transmitted on the corresponding outgoing fiber 108. The purpose of this is to protect installers and other users of the system from eye injuries which can arise because of the intense radiation which may be sent out at a fiber end, particularly when the fiber is supplied with light from a laser at its other end. Hence, in general in this case, no transmission of optical signals is to occur on the outgoing fibers 108 from terminal 104, for which fibers 108 the fibers 106 included in the same pair do not transfer an optical signal.

Case 3 occurs when a receiver 112 is in state of alert and is waiting for a light signal to arrive. Terminal 104 can then periodically determine whether the pair of fibers, to which incoming fiber the receiver 112 is connected, is in operation again for signal transmission. The transmitter 118 which is connected to the outgoing fiber in the same pair of fibers can then during a short, periodically recurring period of time, transmit a light signal although receiver 112 associated with the same pair of fibers does not detect light on the incoming fiber. However, this is to be permitted solely for one pair of fibers at a time, on the one hand so that a too sudden power increase in terminal 104 does not occur, which might disturb the function of the terminal, for example induce disturbances in the supply voltage for a driving circuit card and thereby disturb the communication on pairs of fibers which already are functioning, and on the other hand to limit the light intensity in any possibly broken-off fibers. If even brief transmission is initiated concurrently on a plurality of outgoing fibers, on which no signal has been transmitted earlier, the emitted light intensity may namely be altogether too high, counted on the interrupted fibers. Hence, generally speaking, transmission in this case is to be carried out intermittently or recurring periodically on the outgoing fibers 108 which are included in pairs of fibers in which the incoming fiber 106 does not have a signal. In the intermittent transmission it should be ensured that transmission does not occur simultaneously in a plurality of relevant outgoing fibers but solely in one at a time. The transmission is to be carried out with so low power that light having an intensity injurious to the eyes cannot be transmitted from broken-off fiber ends.

These cases can be handled by means of the output signals of channel selector 126 and OR gates 124, respectively. The channel selector is controlled by the clock signal from clock generator 128 and delivers on its output lines, which in number are equal to the number of pairs of fibers in link 102, pulses for successively and cyclicly activating the control circuits 122. Because of the OR circuits 124 this activation only occurs for those fibers included in pairs of fibers of which the incoming fiber 106 does not carry an optical signal. If the number of fibers in link 102 is N, there will be N/2 pairs of fibers, and the transmitter 118, which belongs to such inactive pair of fibers, can then be active during not more than 1/(N/2) of the total time on the average. However, this generally results in altogether too high average power for each transmitter and on each outgoing fiber, and therefore the activating pulses are to advantage positioned separate from each other as is indicated in FIG. 1. If the control pulses are designed with intermittent spacing, each transmitter will be active during a shorter period on the average. Generally speaking, the average power is generally speaking determined by both the length and the frequency of the activating pulses. The successive transmission during short periods of time shows up as a pulse width modulation of the average output power level for each transmitter 118 and thereby lowers the average power so that it will amount to not more than a minor portion of the normal power of the transmitter.

The activating portions of the selector signals and thereby the active portions of the transmitters 118 must be of such duration that a receiver 112 and an amplifier/detector 114 in a second terminal connected to the opposite end of fiber link 102 will have time to detect that there is an incoming signal. After such detection having been carried out, a transmitter associated with the same pair of fibers in the second terminal begins to transmit, in its turn, optical signals so that the amplifier/detector 114 in the first terminal 104 has time to detect that there now is an incoming signal. If this entire procedure is carried out sufficiently slowly, a functioning communication over an earlier inactive pair of fibers can be established. The activating portions will therefore have to be of a length which is twice the length of the time constant for detection, which is generally applicable in the link for communication over a pair of fibers.

Terminal 104 does not have to have the same number of receivers 112 and amplifiers/detectors 114 as control units 122 and transmitters 118. What is significant is that when a loss of optical power is detected on an incoming fiber, the power in transmission on at least two fibers must be reduced, wherein this reduction must be made in time division, for example for at least a number of outgoing fibers equal to the number of incoming fibers for which power loss has been detected.

An alternative fiber optical communication system comprising communication links 102 between terminal 104 and a plurality of other terminals. Each communication link comprises a plurality of optical fibers, which for the relevant terminal 104 connected to the link are subdivided into incoming fibers 106 and outgoing fibers 108, whereby pairs of optical fibers are obtained, with an incoming fiber and an outgoing fiber in each pair. Each one of said other terminals is connected to at least one of these pairs of fibers. Terminal 104 receives signals or information and transmits signals or information to the other terminals in the communication system.

What is claimed is:

1. A terminal (104) for being connected to a communication link (102) comprising a plurality (N) of individual optical fibers comprising incoming fibers (106) and at least two outgoing fibers (108), with the incoming fibers being intended for transmitting light, which carries optical signals, to the terminal and the outgoing fibers being intended for transmission of light, which carries optical signals, from the terminal, characterized by detecting devices (114) connected to the incoming fibers for detecting whether light with an intensity or a power greater than or equal to a predetermined threshold level is transferred on the incoming fibers, and a control device (122, 124, 126) connected to the detecting devices for receiving detection signals and being connected to the outgoing fibers for permitting solely periodic transmission of light on each one of at least two of the outgoing fibers when at least one of the detection signals indicates that light with an intensity or power lower than the threshold level is being transferred on one of the incoming fibers, wherein, when the periodic transfer of light on said at least two of the outgoing fibers occurs, said light is transferred on solely one of these at each time.

2. A terminal in accordance with claim 1, characterized by receivers (112), each one being connected to an individual fiber of the incoming fibers and an associated one of the detecting devices for converting transferred light to electrical signals which are delivered to the associated detecting device, with the detecting devices being adapted to produce from the electrical signals on the one hand information-carrying electrical signals which are delivered on an outgoing electric line (116), and on the other hand said detection signal.

3. A terminal in accordance with claim 1, characterized by transmitters (118), each one of which is connected to an individual fiber among the outgoing fibers, to the control device and to a line (120) for incoming electrical information-carrying signals for converting the latter to optical signals and for transmitting them on the outgoing fiber.

4. A terminal in accordance with claim 1, characterized in that the control device comprises a control unit (122) for each outgoing fiber and a channel selector unit (126) connected to the control units for selecting the one of said at least two outgoing fibers on which light is to be transferred.

5. A terminal in accordance with claim 4, characterized in that the channel selector unit is adapted to generate the selector signals, one selector signal for each outgoing fiber to be delivered to the control unit for said outgoing fiber.

6. A terminal in accordance with claim 5, characterized in that each selector signal comprises periodically repeated portions which indicate that transfer is permitted and which are separated in time from corresponding portions of the other selector signals, and that between said portions there exist time periods which indicate that transfer is not permitted in the case that light with an intensity or power lower than the threshold value is not transferred on a corresponding incoming fiber.

7. A terminal in accordance with claim 4, characterized in that the channel selector unit is connected to the control units by means of gates in such manner that each gate as its input signals receives, on the one hand a selector signal generated by the channel selector unit and on the other hand the detection signal from one of the detector units, and as an output signal delivers a control signal to one of the control units.

8. A terminal in accordance with claim 1 for being connected to a communication link comprising equally many (N/2) incoming fibers (106) and outgoing fibers (108) for forming equally many pairs of fibers, wherein each pair of fibers includes an incoming fiber and an outgoing fiber and wherein each fiber only includes a single pair of fibers, characterized in that the control device comprises a control unit (122) for each outgoing fiber and in that the detection signal from each one of the detecting devices is delivered to the control unit and to the outgoing fiber which is included in the same pair as the incoming fiber to which the detecting device is connected.

9. A method for limiting light transferred in outgoing fibers at an interruption in any incoming fiber included in a communication link (102) connected to a terminal (104), said communication link comprising a plurality (N) of individual optical fibers, including incoming fibers (106) and at least two outgoing fibers (108), wherein light, carrying optical signals, is transferred on the incoming fibers to the terminal, and wherein light, carrying optical signals, is transferred to the outgoing fibers from the terminal, characterized by the steps of:

detecting whether light of intensity or power greater than or equal to a predetermined threshold level is transferred to the incoming fibers, and controlling the transfer of light on the outgoing fibers depending on the result of the detection, so that light is solely periodically transferred on each one of at least two of the outgoing fibers when the result of the detection indicates that light, having an intensity or power lower than the threshold value, is transferred on one of the incoming fibers and so that, in the periodic transfer of light on the at least two of the outgoing fibers, light is transferred on solely one of these at each time.

10. A method in accordance with claim 9, characterized by the additional step of converting light transferred on each one of the incoming fibers to electrical signals, wherein in the step of detecting the detection is carried out by producing, from the electrical signals, on the one hand information-carrying electrical signals for being supplied to an electric line (116) outgoing from the terminal, and on the other hand a detection signal which indicates whether light having an intensity or power lower than the threshold value is transferred on the incoming fiber.

11. A method in accordance with claim 9, characterized by the additional step of converting electrical information-carrying signals, incoming to the terminal, into light for transfer on the outgoing fibers.

12. A method in accordance with claim 9, characterized in that in the step of controlling, selector signals are generated for selecting the one of said two at least outgoing fibers on which light is to be transferred.

13. A method in accordance with claim 12, characterized in that in the generating of the selector signals one selector signal is generated for each outgoing fiber, whereby each selector signal contains periodically repeated portions which indicate that transfer is permitted and which are separated in time from corresponding portions of the other selector signals, and that between the portions there are time periods which indicate that transfer is not permitted in the case of light having an intensity or power lower than the threshold level is not transferred on a corresponding incoming fiber.

14. A method in accordance with claim 12, characterized in that the selector signals are combined with detection signals disclosing the result of the detection for producing a combined control signal which controls transfer of light on the outgoing fibers.

15. A method in accordance with claim 9, when the communication link comprises equally many (N/2) incoming fibers (106) as outgoing fibers (108) for forming equally many pairs of fibers, whereby each pair of fibers includes an incoming fiber and an outgoing fiber and each fiber is included in solely one pair of fibers, characterized in that in the step of detecting there is generated a detection signal for each incoming fiber, which indicates the result of the detection, and that in the step of controlling, the detection signals are used for controlling the transfer of light on the outgoing fibers in such manner that each one of the detection signals controls transfer on the outgoing fiber which is included in the same pair as the incoming fiber to which the detecting device is connected.

\* \* \* \* \*